May 16, 1961

W. B. CONVERSE ET AL 2,984,748

GAMMA RAY PROJECTOR

Filed Dec. 21, 1956

INVENTOR.
WILLARD B. CONVERSE
JOSEPH A. PUGLIESE

BY
G. H. Palmer
V. F. Darrio
ATTORNEYS

May 16, 1961  W. B. CONVERSE ET AL  2,984,748
GAMMA RAY PROJECTOR

Filed Dec. 21, 1956  2 Sheets-Sheet 2

INVENTOR.
WILLARD B. CONVERSE
BY JOSEPH A. PUGLIESE

G. H. Palmer
V. F. Davis
ATTORNEYS

United States Patent Office 2,984,748
Patented May 16, 1961

2,984,748

GAMMA RAY PROJECTOR

Willard B. Converse, Glen Rock, and Joseph A. Pugliese, Fairview, N.J., assignors to The M. W. Kellogg Company, Jersey City, N.J., a corporation of Delaware Filed Dec. 21, 1956, Ser. No. 629,974

6 Claims. (Cl. 250—106)

This invention relates to projectors of energy rays for the subsurface photographic examination of objects opaque to visible light and more particularly to projectors of this character adapted to use radioactive isotopes as the energy ray sources.

Subsurface photographic examination of bodies opaque to visible light, prior to the advent of nuclear reactors which artificially produce radioactive isotopes, was carried on to a major extent by the use of X-rays projected from cathode tubes. Projectors which employed gamma rays emitted by the naturally radioactive element radium, were in very limited use. While X-rays in some respects produce photographs superior to those producible by means of the gamma rays, the preponderance of the X-ray is ascribable primarily to the extreme costs of radium, particularly when high curie strength energy sources were required. The cathode tube X-ray projectors were developed to a high degree of perfection and went into widespread use notwithstanding the large amount of bulky and expensive electrical equipment involved. The bulk and weight of the X-ray projectors and auxiliary electrical equipment, particularly when of high energy capacity as is required for penetrating heavy steel objects, are such as to render it impractical to move the projector to the work. Thus, the high energy X-ray installations are generally fixed to or mounted on platforms of limited movement and the work is brought to the projector.

With the advent of the artificially produced radioactive isotopes, the cost of gamma ray sources has been reduced to such a degree that the economics greatly favor the use of the gamma ray over the X-ray. A wide variety of radioactive isotopes are now available that radiate energy over a range of levels sufficient for all practical commercial requirements. Also, artificially produced radioactive isotopes suitable as gamma ray projectors over said energy range are available whose half lives are of sufficient lengths to satisfy commercial requirements. Particular advantages follow from the ability to secure energy sources of extreme capacities as bodies of small bulk, for instance energy sources in the order of 100 curies and more, need not measure more than ½ inch in length and weigh only a few grams.

The radioactive isotopes emit their gamma rays continuously. This poses a serious problem, as such rays are highly destructive to organic material and all personnel must be shielded from direct exposure thereto. The gamma ray projector consequently comprises a large mass of shielding material, usually lead, and arrangements for moving the source from a "safe" position wherein it is shielded, as completely as may be, by said lead mass to an "operative" position wherein it is exposed as required to project the gamma rays over a selected area of the material to be examined and is otherwise shielded by the lead mass.

In one such gamma ray projector the radioactive source is mounted on a movable member which is housed in a chamber in a mass of lead shielding material, formed to provide for movement of said member to carry the radioactive source from the "operative" or "on" position wherein it is aligned with a window in the mass of shielding material for projection of radiation therefrom to a "safe" or "off" position in which radiation is substantially completely absorbed by the mass of lead shielding material. In order to prevent tampering or other unwanted manipulation of the movable member, the projector incorporates a lock device which locks the movable member against movement whenever it carries the radiation source into the "off" or "safe" position. Thus, to move the radiation source out of the "safe" position it is necessary to unlock the lock device by the manipulation of the key thereof. Any accidental movement of the movable member to the "off" position will cause locking. The arrangement just briefly described is completely satisfactory when the projector is so located that the operator can easily contact it for unlocking the movable member. However, when the projector is located at a remote point, the locking of the movable member every time the source is in the "off" position results in unnecessary inconvenience.

It is a principal object of this invention to provide an auxiliary releasable locking arrangement for the control of the movements of the radioactive source which avoids the inconveniences of the prior art, makes manipulation of the radioactive source from a remote point a simple matter, and retains the safety features due to locking of the radiation source against movement in the position of maximum shielding.

It is a further principal object of this invention to provide in a projector of energy rays employing a radioactive isotope as an energy source and which includes a movable member for carrying the radiation source from a "safe" position of maximum absorption of the emitted rays by the shielding material of the projector, to an "in use" position of minimum absorption of the emitted rays by the shielding material of the projector, and means for automatically locking said movable member against movement in the "safe" position of said source, an arrangement such that after said member is unlocked and moved through a short distance to carry said source out of said "safe" position, it is releasably retained against movement so that it may be moved from the releasably retained position at will to the "in use" position.

It is a further principal object of this invention to provide in a projector of energy rays employing a radioactive isotope as an energy source and which includes a rotor rotatable in a chamber formed in a mass of dense radiation absorbing material to carry the radiation source mounted thereon from a "safe" position of maximum absorption of radiation by said shielding material to an "in use" position of minimum absorption of radiation by said shielding material and means for automatically locking said rotor against rotation when it is in the "safe" position of said source, an arrangement adapted to releasably restrain the movement of said rotor after said rotor is unlocked and moved through a short distance away from said "safe" position so that it may be moved from said restrained position to the "in use" position at will without possibility of unwanted locking.

The further features, objects and advantages of the invention will become apparent from the following detailed description of the accompanying drawings in which.

Figure 1:
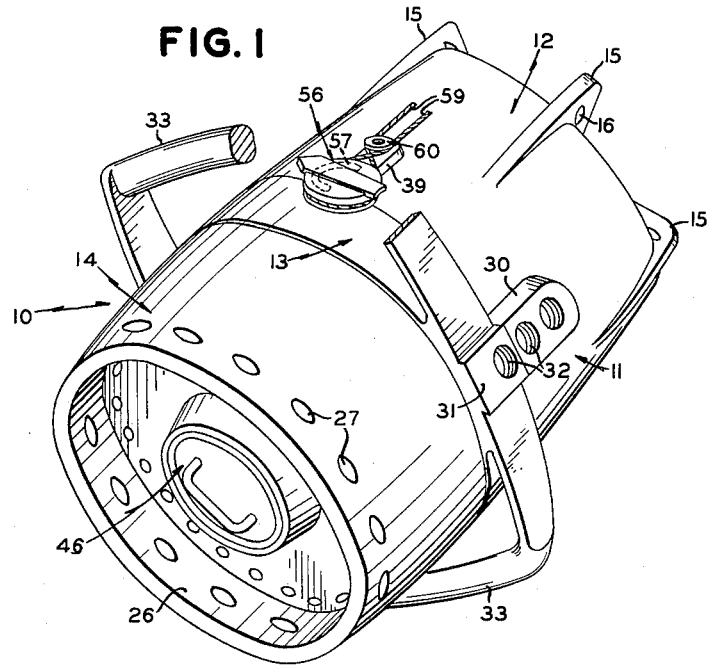
Fig. 1 is an isometric view of a present preferred form of injector embodying the invention.
Figure 4:
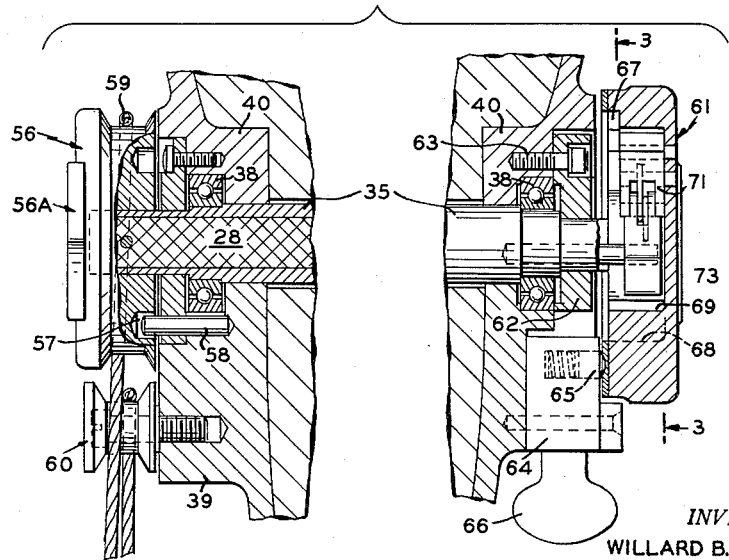
Fig. 4 is a fragmentary longitudinal section similar to that of Fig. 2 illustrating construction details.

The novel arrangement of this invention may be applied to a projector of any practical size and whether such projector mounts the radioactive source on a rotatable member or on a member that is translated or otherwise moved to carry the mounted source from a "safe" position of maximum shielding to an "in use" position of minimum shielding. In either form of projector the novel arrangement of the invention includes means which resiliently and releasably engage the source mounting member when said member is moved a short distance out of the "safe" position of the radioactive source into what may conveniently be called the "ready" or stand-by position. The novel arrangement is such that the source mounting member is held sufficiently firmly against movement in said "ready" position that it cannot be displaced therefrom accidentally, but sufficient force must be deliberately applied for a movement out of said "ready" position. The arrangement is also such that said "ready" position is so located in the path of movement of the source mounting member, that when the source carrying member is in the "ready" position, shielding of the source is close to the maximum so that the usual manipulations of the work and of the projector can be made without subjecting the operator and his attendants to excessive radiation.

The projector 10 shown in the drawings is a projector of intermediate size which weighs in the order of about 300 pounds and is adapted to employ as an energy source either a comparatively large amount of a low penetrating isotope such as iridium 192 or a comparatively small amount of high penetrating isotope such as cesium 137. A projector of this size is easily portable and positionable relative to the work. As shown the projector 10 includes a casing 11 formed of metal such as steel that is sufficiently sturdy to withstand service conditions and accidental fires and droppings. The casing 11 is formed of a bottom pot-like section 12, a middle section 13 and a cover section 14. The bottom section 12 includes a plurality of radially disposed fin-like members 15, welded, cast or otherwise integrated therewith, which are bored as at 16 to provide holes into which instrumentalities, not shown, may be inserted for lifting and/or positioning the projector. The sections 12 and 13 are formed into a demountable unit by the circular series of bolts 19 which pass through holes in the flange 21 and screw into tapped holes in the flange 17. A diaphragm partition 22 closes the upper end of the cover section 14 and includes a circular series of holes at the outer portion thereof through which pass the bolts 24 that screw into tapped holes in the flange 21 at the upper end of the section 13 to removably secure the cover section 14 to the middle section 13. A ring flange 26 extends from the diaphragm 22 of the cover section 14 and is provided with a circular series of holes 27 which like the holes 16 are also adapted to receive lifting and positioning instrumentalities as required in the use of the projector 10.

The upper end of the bottom section 12 is enlarged at diametrically opposed portions thereof to form the bosses 30. These bosses are bored and tapped to provide the tapped holes 32 into which eye bolts, trunnion ends, and the like, may be screwed for the purpose of aiding orientation and manipulation of the projector 10. In line with the bosses 30, the middle section 13 is likewise enlarged to form the bosses 31. These latter bosses are likewise bored and threaded to provide tapped holes 32 which may also receive the threaded end of an eye bolt, trunnion, etc., for the purpose just stated. From the bosses 31 extend the handles 33 which are used in moving and positioning the projector 10.

The sections 12 and 13 are separately filled with the lead shielding 28 as by casting molten lead therein, and then machined to provide the component parts of the chambers which house the rotor 34 and the shaft 35 upon which the rotor 34 is mounted. The shaft 35 is preferably a hollow steel shaft whose central bore is filled with lead to keep the radiation leakage therethrough to a minimum. As shown in the drawings, the rotor 34 is formed of lead shielding material 28, and comprises the central cylindrical section 37 of large diameter having two cylindrical sections 36 of smaller diameter on each side thereof. The cylindrical section 37 is connected to the cylindrical sections 36 by frusto-conical sections. Frusto-conical sections also connect the smaller cylindrical sections 36 to the shaft 35. The shaft 35 is carried on frictionless bearings 38 mounted in the bosses 39 and 40 formed as enlargements in the upper end of the bottom section 12 and the lower end of the middle section 13 respectively. The top surface of the middle section 13 is closed by a separator plate of stainless steel or similar material which as shown includes an inner corrugated portion 42 and an outer substantially flat portion 43. The separator plate 43 carries a removable dust cap 44 attached thereto in any convenient way. The cover section 14 is likewise filled with lead shielding material 28 and has its bottom surface complementarily shaped to receive the plate 43 and the dust cap 44.

The diaphragm partition 22 includes a circular flange 45 which extends inwardly therefrom. The flange 45 is internally stepped and the lower portion of the internal periphery thereof threaded to receive the threaded external lower periphery of the closure 46 and support said closure 46 in position in the flange 45. The diaphragm 22 is apertured within the flange 45 to receive the solid conical shielding plug 47 which is adapted to be seated in the conical projection aperture A formed in the shielding 28 of the cover section 14. The plug 47 is preferably of lead and serves to close the projection aperture A when the projector 10 is not in active use. The plug 47 absorbs gamma rays which pass to it and acts as part of the shielding 28. When the projector 10 is in active use the closure 46 and the plug 47 are removed so that the gamma rays emitted by the radioactive source may pass unimpeded to the material to be examined.

Figure 2:
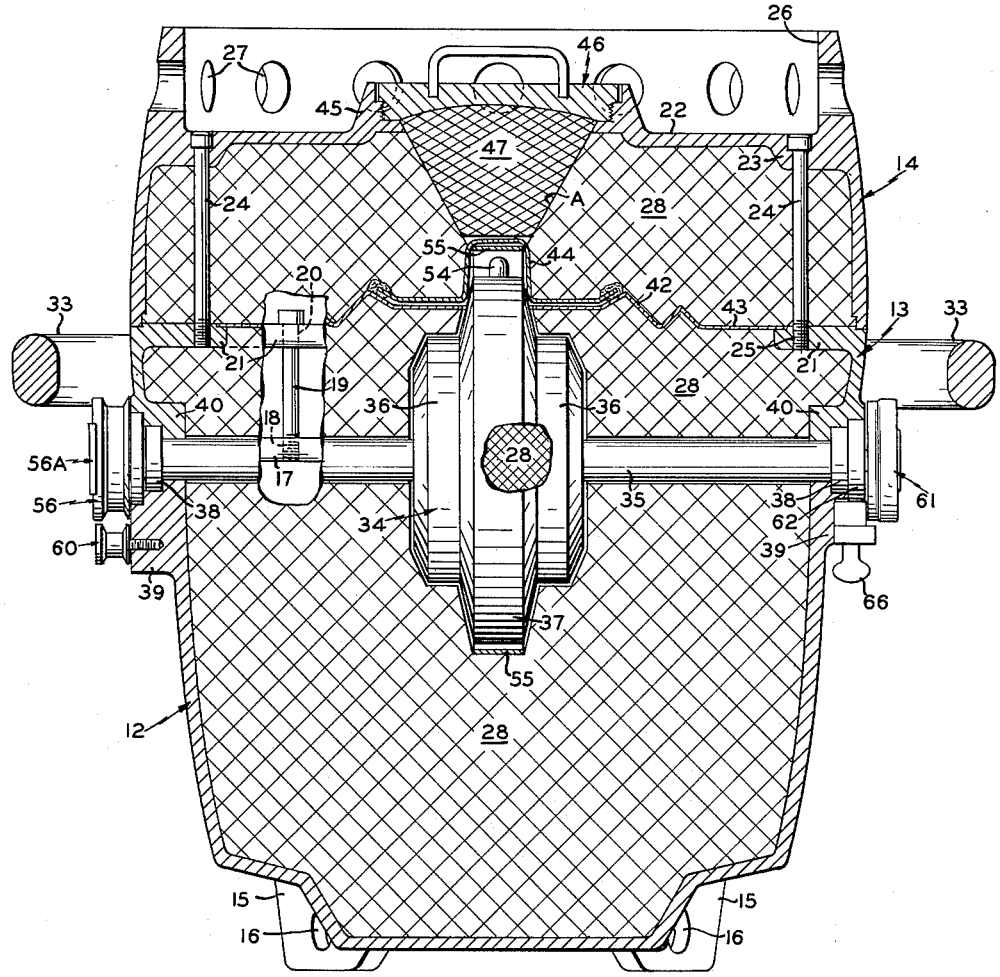
Fig. 2 is a longitudinal section through the projector of Fig. 1 illustrating features of the internal construction thereof.
Figure 3:
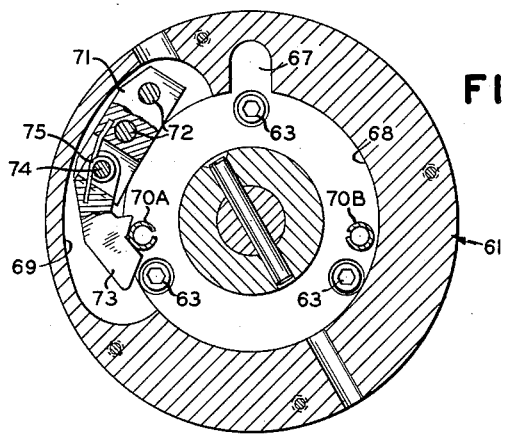
Fig. 3 is a sectional view taken on the lines 3—3 of Fig. 4.

The rotor 34 is bored radially to accommodate the capsule 54 which is mounted therein in a manner not shown, to be constantly urged outwardly of said bore, means also not shown, being provided to retain said capsule 54 in the extreme outward position of Fig. 2. The capsule 54 is made of stainless steel or similar material and houses adjacent its outer hemispherical end the radioactive isotope body which is to serve as the source of the gamma rays. In this "in use" or "on" position of Fig. 2, maximum radiation for radiographic examination is available, it being understood that in this "on" position the plug 47 is removed for beam shots and that the cover 14 is removed for panoramic shots.

In order to secure the maximum shielding effect when the isotope body is not in use as a radiator, it is desired that the capsule 54 be retracted substantially completely within its housing bore and that it be positioned as closely as may be at the center of the shielding material 28. For this purpose a metal band or cam track 55 is provided within the chamber which houses the rotor 34 to cover the portion thereof opposite the periphery of the section 37. The band 55 is formed of aluminum or similar material and is fastened to the shielding material 28 in any convenient way as for instance by screws. The portion of the band 55 within the chamber which houses the rotor 34 is of circular section to match the wall of said chamber contacted thereby. External of said chamber the band 55 approaches a cam nose in form. The band 55 is shaped to define a cam track such that upon rotation of the rotor 34 in either direction from the position of Fig. 2, the capsule 54 will contact the band 55 and be urged thereby into its housing bore, the band 55 maintaining the capsule 54 substantially entirely within the housing bore as long as the capsule 54 is within the chamber housing the rotor 34. The maximum shielding is obtained when the rotor 34 is rotated to carry the capsule 54 through 180° from the position shown in Fig. 2; this is the "safe" of "off" position.

For the purpose of rotating the rotor 34 to carry the capsule 54 from the "on" position wherein the gamma ray radiator is exposed to the maximum amount to the "safe" position, 180° removed from said "on" position, the left hand end of the shaft 35 as shown in Fig. 2 has a knob 56 mounted thereon and pinned thereto. The knob 56 includes a circular groove 57 in its inner face which extends for about 180° and in which is adapted to fit a stop pin 58 carried in a bore in the boss 39. The knob 56 may have a groove in its outer periphery to accommodate a cord 59 or other means for rotating the knob 56 and the rotor 34 from a remote point. To facilitate such operation a rotor 60 over which the cord 59 is adapted to pass is provided. The rotor 60 is mounted for rotation on the boss 39 below the knob 56. The groove 57 and the pin 58 are so shaped and located that when the pin 58 is at one end of the groove 57 the capsule 54 is in the "on" position thereof and when the pin is at the other end of the groove 57 the container 54 is in the "safe" position. A pointer 56A is attached to the knob 56, or may form an integral part thereof to visually indicate the position of the capsule 54 since the projector 10 thus far described does not in its specific details form part of this invention, the above brief description thereof is believed ample for the purposes of this disclosure.

In accordance with the present invention, at the right hand end of the shaft 35, as viewed in Fig. 2, is pinned a knob 61 for movement with the shaft 35 and the knob 56. The bosses 39 and 40 are bored to accommodate a flange plate 62 which is fastened to said bosses as by the screws 63 and holds the bearing 38 in position. The bottom end of the flange plate 62 is cut away to permit the insertion of the lock barrel 64 into a vertical bore in the boss 39. The barrel 64 is held in position as by suitable screws. The lock barrel 64 carries a spring pressed latch 65 which is normally urged outwardly toward the knob 61 and is retractable from said knob by the rotation of a key 66.

The bore 67 is provided in the underside of the knob 61 and so located that the latch piece 65 will enter it to lock the knob 61 against movement when the rotor 34 has been rotated to carry the capsule 54 into the "safe" position. The underside of the knob 61 has an annular groove 68 formed therein which includes an offset groove 69 as an extension thereof. In the operative position, the roll pins 70A and 70B project into the groove 68. The pins 70A and 70B are spaced 165° apart and while they pass through appropriate holes in the flange plate 62 are firmly seated in the holes drilled in the boss 39. A latch bracket 71 is positioned in the groove enlargement 69 and is fastened to the underside of the knob 61 as by the screws 72. The latch bracket 71 has one end bifurcated to receive between the tynes thereof one end of the latch piece 73 which is pivoted thereto by means of the pivot pin 74. The pivoted end of the latch piece 73 is likewise bifurcated to receive helical spring 75 which surrounds the pin 74 and has one end fixed to the latch piece 73 and the other fixed to the latch bracket 71 so as to constantly urge the latch piece 73 toward the groove 68. The latch piece 73 has a V-shaped conformation at its inner face to engage the pins 70A and 70B and to thereby resiliently restrain the rotation of the knob 61. With the radiation source in the "on" position, the bore 67 is 180° removed from the position of engagement with the latch piece 65 and the latch piece 73 engages pin 70A to resiliently hold the rotor 34 in the "on" position. The amount of force exerted by the latch piece 73 is sufficient to hold the knob 61 against accidental movement so that to carry the rotor away from the "on" position, force must be deliberately exerted. When it is desired to move from the "on" position the knob 61 is rotated counterclockwise by the application of sufficient force to overcome the force exerted by the spring 75 to carry the latch piece 73 out of engagement with the pin 70A. After 165° travel, latch piece 73 will engage the pin 70B, and the rotor will be resiliently restrained. It is generally not practical or desirable to make spring 75 so strong that it will absorb the full force due to the momentum of the rotor 34 so as to hold the rotor 34 against further movement when the latch piece 73 engages the pin 70B at the end of the mentioned 165° travel. However, when the service requires it, spring 75 may be made of a size to enable it to resiliently lock the rotor 34 against further movement when the latch piece 73 engages the pin 70B. In the present preferred embodiment of the invention the spring 75 is not strong enough to lock the rotor 34 against further movement so that after the latch piece 73 engages the stop 70B the rotor 34 will continue in its motion to the "off" position to be locked therein by the entrance of the latch 65 into the bore 67. In its locked position the rotor 34 cannot be rotated so that the radiation source will be shielded to the maximum degree as long as the "off" condition persists. When further use is required the operator after positioning the film relative to the material to be examined and making all other necessary adjustments and dispositions, will unlock the shaft 35 by rotating key 66 to carry latch 65 out of the bore 67. Upon the rotation of the shaft 35 through about 15° the latch piece 73 will engage the pin 70B with the result that the rotor 34 will be resiliently restrained against further movement due to the low momentum of the rotor 34, the spring 75 is strong enough to accomplish this result at this time. This position, i.e. when the latch piece 73 engages pin 70B, may conveniently be referred to as the "ready" position. The rotor 34 may be held in the "ready" position against accidental displacement indefinitely. In the "ready" position maximum shielding is approached. When all preparations are completed and it is desired to make the actual exposure the knob 56 is rotated to carry the latch piece 73 out of engagement with the pin 70B and into engagement with the pin 70A wherein the capsule 54 is in the "in use" position.

Although many changes may be made in the scope of the invention herein described, it is intended that all matter contained in the above description and accompanying drawings shall be interpreted as illustrative and not limitative.

We claim:

1. A ray projector adapted to employ a radioactive energy source, a mass of shielding material having an aperture therein for unimpeded passage of energy rays, a radioactive energy source, a rotor mounting said energy source and housed for rotation in said mass to carry said source from a position of maximum shielding within said mass to a position of minimum shielding in registry with said aperture, said position of minimum shielding and said position of maximum shielding being spaced approximately 180° apart in the rotation path of said rotor member, means locking said rotor member against movement when said energy source is moved into said maximum shielding position, means for operating upon said locking means to release said rotor member for movement to carry said source toward said minimum shielding position, and means adapted to releasably restrain the movement of said rotor member when said source is moved out of said position of maximum shielding to a ready position wherein the shielding effects of said mass approaches that of said position of maximum shielding, said ready position located approximately 15° from said position of maximum shielding.

2. A ray projector adapted to employ a radioactive energy source, a mass of shielding material having an aperture therein for unimpeded passage of energy rays, a radioactive energy source, a rotor mounting said energy source and housed for rotation in said mass to carry said source from a position of maximum shielding within said mass to a position of minimum shielding in registry with said aperture, said position of minimum shielding and said position of maximum shelding being spaced approximately 180° apart in the rotation path of said rotor member, means locking said rotor member against movement when said energy source is moved into said maximum shielding position, means for operating upon said locking means to release said rotor member for movement to carry said source toward said minimum shielding position, and means adapted to releasably restrain the movement of said rotor member when said source is moved out of said position of maximum shielding to a ready position wherein the shielding effects of said mass approaches that of said position of maximum shielding, said ready position located approximately 15° from said position of maximum shielding, said releasably restraining means including a pin and a spring biased latch adapted to engage said pin in the ready position of said rotor member.

3. A ray projector adapted to employ a radioactive energy source, a mass of shielding material having an aperture therein for unimpeded passage of energy rays, a radioactive energy source, a rotor mounting said energy source and housed for rotation in said mass to carry said source from a position of maximum shielding within said mass to a position of minimum shielding in registry with said aperture, said position of minimum shielding and said position of maximum shielding being spaced approximately 180° apart in the rotation path of said rotor member, means locking said rotor member against movement when said energy source is moved into said maximum shielding position, means for operating upon said locking means to release said rotor member for movement to carry said source toward said minimum shielding position, and means adapted to releasably restrain the movement of said rotor member when said source is moved out of said position of maximum shielding to a ready position wherein the shielding effects of said mass approaches that of said position of maximum shielding, said ready position located approximately 15° from said position of maximum shielding, said releasably restraining means including a spring biased latch and a pair of spaced pins, one of said pins positioned to be engaged by said latch when said source is in the ready position, the other of said pins positioned to be engaged by said latch when said source is in said position of minimum shielding.

4. A ray projector adapted to employ a radioactive energy source, a mass of shielding material having an aperture therein for unimpeded passage of energy rays, a radioactive energy source, a rotor mounting said energy source and housed for rotation in said mass to carry said source from a position of maximum shielding within said mass to a position of minimum shielding in registry with said aperture, said position of minimum shielding and said position of maximum shielding being spaced approximately 180° apart in the rotation path of said rotor member, means locking said rotor member against movement when said energy source is moved into said maximum shielding position, means for operating upon said locking means to release said rotor member for movement to carry said source toward said minimum shielding position, and means adapted to releasably restrain the movement of said rotor member when said source is moved out of said position of maximum shielding to a ready position wherein the shielding effects of said mass approaches that of said position of maximum shielding, said releasably restraining means comprising a knob mounted for rotation with said rotor member, a spring pressed latch mounted on said knob, and a pin mounted on said mass and fixed relative thereto, said latch adapted to engage said pin when said source is moved to said ready position.

5. A ray projector adapted to employ a radioactive energy source, a mass of shielding material having an aperture therein for unimpeded passage of energy rays, a radioactive energy source, a rotor mounting said energy source and housed for rotation in said mass to carry said source from a position of maximum shielding within said mass to a position of minimum shielding in registry with said aperture, said position of minimum shielding and said position of maximum shielding being spaced approximately 180° apart in the rotation path of said rotor member, means locking said rotor member against movement when said energy source is moved into said maximum shielding position, means for operating upon said locking means to release said rotor member for movement to carry said source toward said minimum shielding position, and means adapted to releasably restrain the movement of said rotor member when said source is moved out of said position of maximum shielding to a ready position wherein the shielding effects of said mass approaches that of said position of maximum shielding, said releasably restraining means comprising a knob mounted for rotation with said rotor member, a spring pressed latch mounted on said knob, and a pair of spaced pins mounted on said mass and fixed relative thereto, said latch adapted to engage one of said pins when said source is moved to said ready position and the other of said pins when said source is moved to said position of minimum shielding.

6. A ray projector adapted to employ a radioactive energy source, a mass of shielding material having an aperture therein for unimpeded passage of energy rays, a radioactive energy source, a rotor mounting said energy source and housed for rotation in said mass to carry said source from a position of maximum shielding within said mass to a position of minimum shielding and said position of maximum shielding being spaced approximately 180° apart in the rotation path of said rotor member, means locking said rotor member against movement when said energy source is moved into said maximum shielding position, means for operating upon said locking means to release said rotor member for movement to carry said source toward said minimum shielding position, and means means adapted to releasably restrain the movement of said rotor member when said source is moved out of said position of maximum shielding to a ready position wherein the shielding effects of said mass approaches that of said position of maximum shielding, said releasably restraining means comprising a knob mounted for rotation with said rotor member, a bracket fixed to said knob, a latch piece having a V notch cut in its inner side pivotally mounted on said bracket, a helical spring connected to said bracket and said latch piece continuously urging said latch piece toward the center of said knob, a pair of pins fixed to said mass and positioned in the path of said latch piece as said knob rotates with said rotor member, one of said pins positioned to be engaged by said latch piece when said source is moved to the ready position, the other of said pins positioned to be engaged by said latch piece when said source is moved to the position of minimum shielding.

References Cited in the file of this patent

UNITED STATES PATENTS

| 2,477,648 | Piggot et al. | Aug. 2, 1945 |
| 2,684,447 | Gilks | July 20, 1954 |
| 2,719,926 | Proctor et al. | Oct. 4, 1955 |
| 2,772,361 | Hiestand | Nov. 27, 1956 |
| 2,876,363 | Forrer et al. | Mar. 3, 1959 |